US009402191B2

(12) United States Patent
Marzetta et al.

(10) Patent No.: US 9,402,191 B2
(45) Date of Patent: Jul. 26, 2016

(54) DUAL-TIER WIRELESS COMMUNICATION SYSTEM

(71) Applicant: Alcatel-Lucent USA Inc., Murray Hill, NJ (US)

(72) Inventors: Thomas L. Marzetta, Summit, NJ (US); Hong Yang, Ledgewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 301 days.

(21) Appl. No.: 13/862,613

(22) Filed: Apr. 15, 2013

(65) Prior Publication Data

US 2014/0307594 A1 Oct. 16, 2014

(51) Int. Cl.
*H04J 4/00* (2006.01)
*H04W 16/32* (2009.01)
*H04B 7/06* (2006.01)

(52) U.S. Cl.
CPC ............. *H04W 16/32* (2013.01); *H04B 7/0617* (2013.01)

(58) Field of Classification Search
None
See application file for complete search history.

(56) References Cited

U.S. PATENT DOCUMENTS

| | | | | |
|---|---|---|---|---|
| 2002/0167954 | A1* | 11/2002 | Highsmith et al. | 370/406 |
| 2011/0150113 | A1 | 6/2011 | Oyman et al. | |
| 2011/0243057 | A1* | 10/2011 | Shin et al. | 370/315 |
| 2013/0163507 | A1* | 6/2013 | Hoshino et al. | 370/315 |
| 2014/0204902 | A1* | 7/2014 | Maltsev | H04W 36/0083 370/331 |
| 2014/0349647 | A1* | 11/2014 | Chen | H04W 36/30 455/436 |

FOREIGN PATENT DOCUMENTS

WO 2013043395 A1 3/2013

OTHER PUBLICATIONS

International Search Report mailed on Nov. 11, 2014, in connection with International Patent Application No. PCT/US14/31166, 3 pgs.

* cited by examiner

*Primary Examiner* — Chi H Pham
*Assistant Examiner* — Fahmida Chowdhury
(74) *Attorney, Agent, or Firm* — Chiesa Shahinian & Giantomasi, PC

(57) ABSTRACT

Systems and methods for communicating data over a dual-tier wireless communication system are provided. A dual-tier wireless communication system comprises an upper tier cell-free large-scale antenna system including a plurality of service-antennas distributed in a designated coverage area for providing wireless access service to mobile terminals, and a lower tier of one or more concentrated large-scale antenna system arrays arranged within a plurality of cells of the designated coverage area for providing backhaul service to the plurality of service-antennas. The upper tier and the lower tier operate in disjoint frequency bands with respect to each other.

20 Claims, 4 Drawing Sheets

DUAL-TIER WIRELESS COMMUNICATION SYSTEM

TECHNICAL FIELD

The present disclosure is generally directed to wireless communication systems, and more specifically to wireless antenna configurations that provide for scalable wireless communication infrastructure.

BACKGROUND

Major wireless infrastructure providers are looking to augment the throughput of their centrally-managed wireless communications systems through the addition of small-cell access nodes. Small-cell access nodes generally comprise femtocells, picocells and microcells that have a range of about 10 meters to 200 meters.

While small-cell based wireless communication systems promise large-throughputs, there are limits to the scalability of such systems. In particular, the expansion of small-cell based wireless systems to handle more customers requires ever-denser deployments of additional small cells. However, a large increase in the number of small cells can have unintended consequences. For example, even if the radiated power of each small cell is reduced commensurately to increased small-cell density, the aggregate throughput (i.e., the total number of communications that can take place) will ultimately saturate because of mutual interference. Further, as the radius of coverage of each small cell decreases to accommodate increased small-cell density, mobile terminal handoff rates (between cells) will increase, which adds to operational complexity and, in extreme circumstances, to dropped communications. Moreover, increased small-cell density requires both increased electrical power and additional backhaul capabilities to connect to the internet. Therefore, the costs of laying electrical wires and optical fiber for additional power and backhaul requirements also may be a deterrent to unlimited small-cell based expansion.

SUMMARY

In order to address these and other challenges facing modern wireless communication, systems and methods for implementing a dual-tier wireless communication system are disclosed herein. In accordance with an embodiment, a large-scale system of service-antennas comprise an upper tier, wherein the service-antennas are distributed in a cell-free manner over a designated coverage area for providing wireless access service to mobile terminals, and one or more concentrated large-scale antenna system arrays comprising a lower tier are arranged within a plurality of cells of the designated coverage area for providing backhaul service to the plurality of service-antennas. The one or more concentrated large-scale antenna system arrays in the lower tier may provide access service to stationary terminals. The upper tier and the lower tier may operate in disjoint frequency bands with respect to each other. The one or more concentrated large-scale antenna system arrays in the lower tier may comprise a conformal array on a surface of a structure, and each of the plurality of service-antennas in the upper tier may comprise a single antenna and share time and frequency resources.

In accordance with an embodiment, each of the plurality of service-antennas in the upper tier may be configured to determine channel state information for mobile terminals based on uplink pilot sequences and time-division duplex reciprocity, and may be configured to beam-form data-bearing symbols for transmission to the mobile terminals based on the channel state information. An operation to beam-form data bearing symbols may include a linear pre-coding operation.

In accordance with an embodiment, each of the plurality of service-antennas in the upper tier may be configured to distinguish between data-bearing symbols received simultaneously from the mobile terminals based on the channel state information.

In accordance with an embodiment, each of the plurality of service-antennas in the upper tier may be configured to determine a threshold for providing wireless access service to one or more of the mobile terminals based on the channel state information.

In accordance with an embodiment, the one or more concentrated large-scale antenna system arrays in the lower tier may be configured to provide wireless access service for fixed terminals.

These and other advantages of the invention will be apparent to those of ordinary skill in the art by reference to the following detailed description and the accompanying drawings.

DETAILED DESCRIPTION

Large-scale antenna systems have been proposed as generally multi-user, multiple-input, multiple-output (MIMO) wireless communication systems that include very large numbers (e.g., as many as 1 million or more) of service-antennas (also referred to as access points or, individually, as an access point) and a large ratio of service-antennas to terminals under active service. Based on various desired characteristics, large-scale antenna systems (LSAS) can be configured as distributed (cell-free) systems or concentrated (e.g., cellular) systems. A dual-tier wireless communication system, exhibiting the desired characteristics of both distributed and concentrated large-scale antenna systems, is disclosed herein.

Figure 1A:
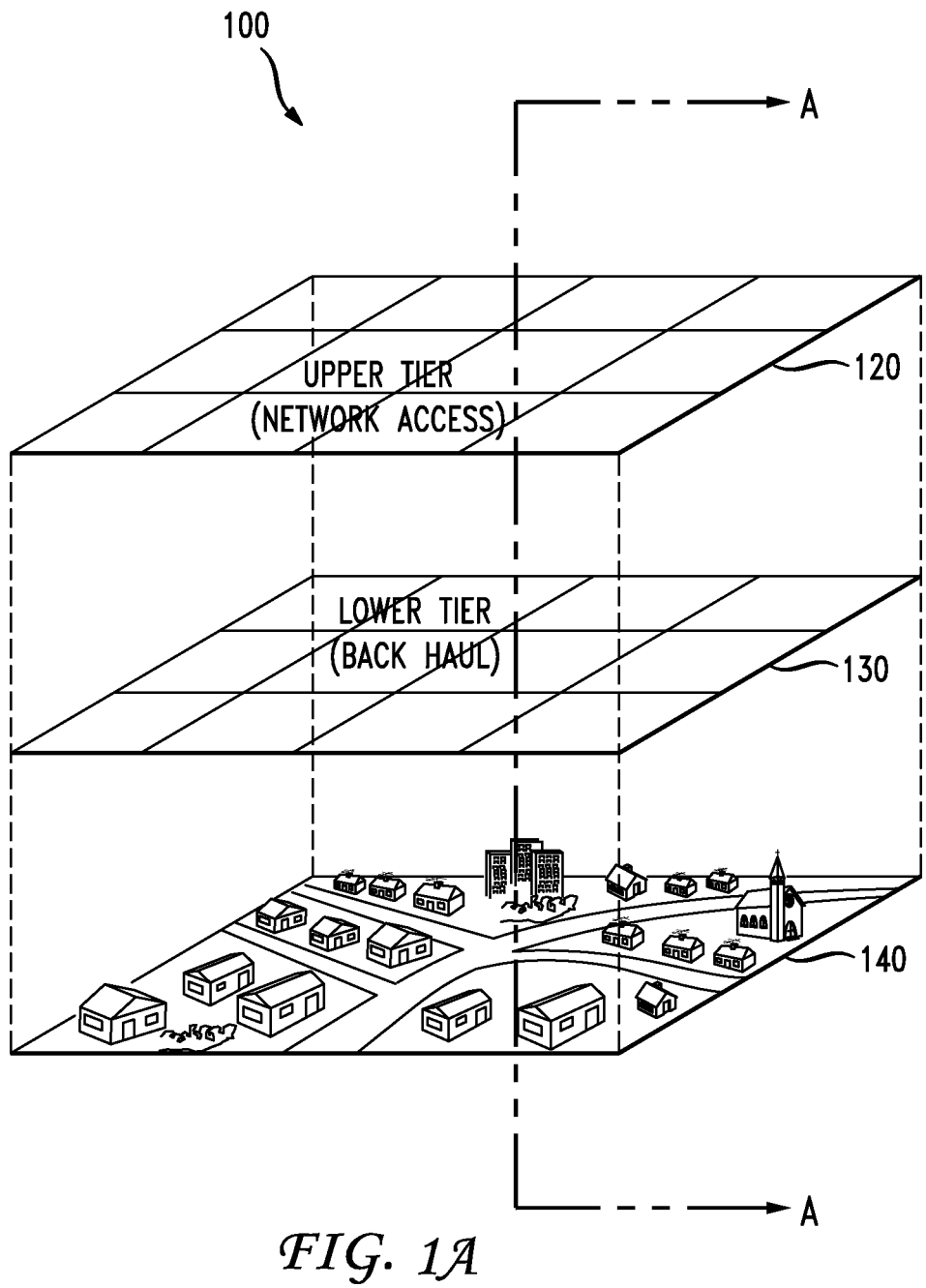
FIG. 1A is a schematic overview diagram of a dual-tier wireless communication system in accordance with an embodiment.

FIG. 1A is a schematic overview diagram of a dual-tier wireless communication system in accordance with an embodiment. Wireless communication system 100 includes two large-scale antenna systems (LSAS). The upper tier 120 of system 100 comprises a distributed LSAS, and the lower tier 130 of system 100 comprises one or more concentrated LSAS arrays.

As shown, upper tier 120 and lower tier 130 overlap within the coverage area 140 of system 100. Therefore, at any point within coverage area 140, the services of both the upper tier 120 and the lower tier 130 are available. Moreover, the services of upper tier 120 and lower tier 130 are specialized to allow system 100 to be scalable to accommodate future wireless communication traffic demands. As described below, upper tier 120 is configured to provide network access to mobile terminals, while lower tier 130 is configured to provide backhaul services to the various access points of upper tier 120. Access service for fixed (stationary) terminals can be handled by either tier, but, in an embodiment, the lower tier provides access service to fixed terminals to avoid extra backhaul transmissions.

Figure 1B:
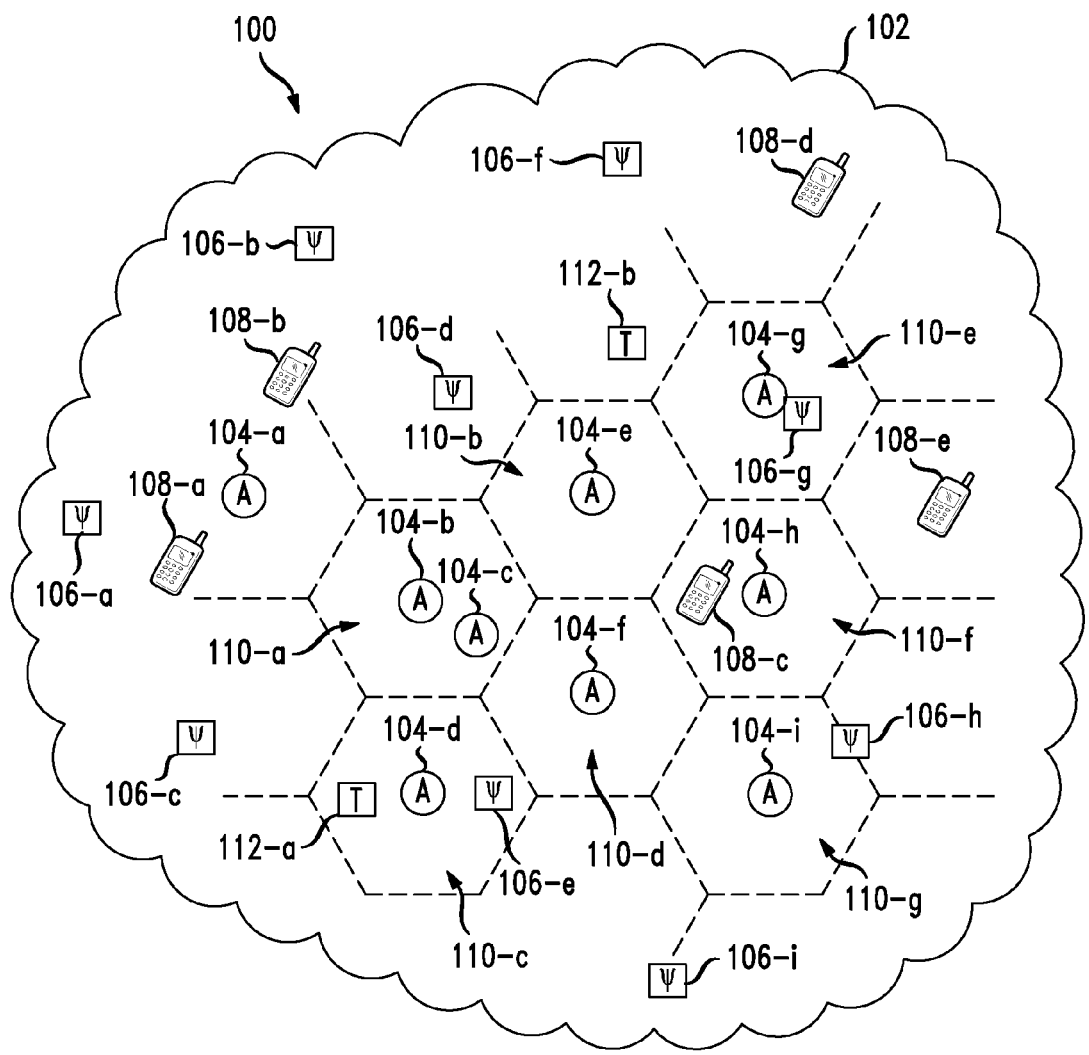
FIG. 1B is a schematic diagram of a dual-tier wireless communication system in accordance with an embodiment.

FIG. 1B illustrates a detailed view (looking downward along line segment A-A) of various LSAS elements of upper tier 120 and lower tier 130 within coverage area 140 shown in FIG. 1A. In an embodiment, upper tier 120 of wireless communication system 100 comprises distributed LSAS 102. Distributed LSAS 102 is cell-free and includes a plurality of service-antennas 106$a$-$i$ distributed throughout coverage area 140 for providing wireless access service to mobile terminals, such as mobile terminals 108$a$-$e$. For example, a large number of service-antennas (e.g., millions of service-antennas), represented by service-antennas 106$a$-$i$, may be distributed throughout a large-scale coverage area (e.g., an entire city) to provide wireless network access service to a plurality of mobile terminals, such as mobile terminals 108$a$-$e$.

In an embodiment, every mobile terminal 108$a$-$e$ within coverage area 140 is served simultaneously by every service-antenna 106$a$-$i$. Consequently, there is no hand-off of mobile terminals from one service-antenna to another. An exemplary distributed LSAS in which the number of service-antennas greatly outnumbers the number of mobile terminals is described in U.S. patent appl. Ser. No. 13/238,329, entitled "Cell-Free Large-Scale Antenna System", which is incorporated herein by reference in its entirety.

Lower tier 130 of wireless communication system 100 comprises one or more concentrated LSAS arrays, such as concentrated LSAS arrays 104$a$-$i$. The lower tier concentrated LSAS arrays 104$a$-$i$ are arranged within a plurality of cells, e.g., cells 110$a$-$g$ of coverage area 140, to provide backhaul service to the plurality of upper-tier service-antennas 106$a$-$i$ and, in certain instances, network access for fixed terminals 112$a$-$b$. For the sake of clarity, additional cells 110 (and concentrated LSAS arrays 104) located throughout coverage area 140 are not shown. However, it should be understood that all of coverage area 140 can be divided into cells that can include one or more concentrated LSAS arrays.

As such, for the embodiments herein, distributed LSAS 102 and the one or more concentrated LSAS arrays 104 serve the entire coverage area 140 of system 100. Moreover, as described in detail below, the service-antennas 106$a$-$i$ in upper tier 120 and the concentrated LSAS arrays 104 in lower tier 130 operate in disjoint frequency bands with respect to each other, and each LSAS tier is ideally suited for its respective task. In addition, upper tier 120 and lower tier 130 are individually scalable to accommodate future wireless communication traffic demands.

Figure 2:
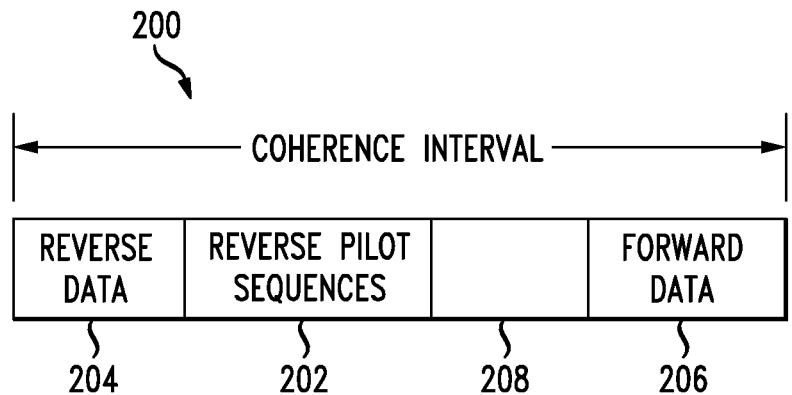
FIG. 2 is a schematic diagram of a coherence interval for implementing a large-scale antenna system in accordance with an embodiment.

In both LSAS tiers of wireless communication system 100, principle communication activities take place within a coherence interval time slot. FIG. 2 is a schematic diagram of an LSAS coherence interval in accordance with an embodiment. Coherence interval 200 is selected based on an assumption that a mobile terminal 108 cannot move geographically by more than ~¼ wave-lengths within the interval. Therefore, within coherence interval 200, channel-state information (CSI), i.e., propagation channel estimates between service-antennas and mobile terminals, for each mobile terminal 108 can be regarded as being effectively constant. Here, the coherence interval represents a time and radio frequency wireless transmission resource block in which CSI can be acquired during a portion of the slot and used with confidence during the remainder of the slot. The description below describes the various operations of upper tier 120 of system 100. It should be understood, however, that lower tier 130 can operate according to the same LSAS principles.

As used herein, down-link communications describe communications to mobile terminals (e.g., from service-antennas 106$a$-$i$), while up-link communications describe communications received from mobile terminals (e.g., at service-antennas 106$a$-$i$).

On the down-link of distributed LSAS 102, CSI is required to enable the service-antennas 106$a$-$i$ to simultaneously transmit (i.e., in the same time/frequency bins) information-bearing symbols selectively to the mobile terminals 108$a$-$e$. On the up-link, CSI is required to enable service-antennas 106$a$-$i$ to distinguish the information-bearing symbols received from mobile terminals 108$a$-$e$ (e.g., after being transmitted simultaneously by mobile terminals 108$a$-$e$). As such, each service-antenna 106$a$-$i$ is operable to obtain CSI for each mobile terminal 108$a$-$e$ by utilizing up-link (reverse-link) pilot signals received from mobile terminals 108$a$-$e$ and time-division duplex (TDD) reciprocity. For example, based on TDD reciprocity, service-antennas 106$a$-$i$ can use the same frequency-band for both up-link and down-link transmissions. As such, TDD reciprocity allows for the time necessary to acquire CSI to be independent of the number of service-antennas. Therefore, distributed LSAS 102 can be scalable with respect to the number of deployed service-antennas 106 to improve multiplexing selectivity, reduce total radiated power in proportion to the number of service-antennas 106, flatten the effective channel frequency-response and simplify necessary power control components.

As shown in FIG. 2, the central operation in coherence interval 200 is the transmission of up-link (reverse-link) pilot sequences 202 by mobile terminals 108$a$-$e$, from which the service-antennas 106 can estimate the up-link propagation channels, which, via TDD reciprocity, are equal to the down-link channels. The transmission of up-link pilot sequences 202 is preceded by up-link (reverse) data transmission 204. For up-link data transmission 204, the mobile terminals 108$a$-$e$ may transmit data-bearing symbols (i.e., data packets) simultaneously while sharing time and frequency resources, subject to power-control rules (if any). The service-antennas 106$a$-$i$ then collectively process the received signals to distinguish the individual transmissions by utilizing the acquired CSI. A large ratio of service-antennas to mobile terminals can allow for linear decoding (e.g., de-multiplexing). Specific linear combinations of the data-bearing signals received by service-antennas 106$a$-$l$ can yield estimates for the data-bearing symbols for mobile terminals 108$a$-$e$, where the combining coefficients depend on the channel-estimates. Examples of linear combining include matched-filtering and zero-forcing.

The transmission of reverse-link (up-link) pilot sequences 202 is followed by forward (down-link) data transmission 206. In coherence interval 200, the blank space 208 between reverse pilot sequence 202 and forward data 206 represents a time interval required by the LSAS to estimate the CSI for use in forward data transmission 206. Similar to up-link data transmission 204, a large ratio of service-antennas to terminals can allow for linear pre-coding (e.g., multiplexing). For example, a linear pre-coding operation may multiply a vector of data-bearing symbols intended for mobile terminals 108$a$-$e$ by a matrix, whose elements depend on the channel state estimates, to create a vector of signals which the service-antennas 106 can jointly transmit. The linear pre-coding operation may also account for power control, such as for mitigating interference, and possibly for controlling the data transmit rate. As such, linear pre-coding allows for each mobile terminal 108 to receive the data-bearing symbol intended for it with minimal interference from the data-bearing symbols that are directed to other mobile terminals.

In an embodiment, distributed LSAS 102 and concentrated LSAS 104 can be implemented using orthogonal frequency-division multiplexing (OFDM). One skilled in the art will note, however, that other LSAS implementations are possible, including time-domain implementations and implementations that employ channel-adaptive waveform modulation. For example, long-term evolution (LTE)-typical values for OFDM parameters (in seconds) can be assumed such that symbol-interval $T_s = 10^{-3}/14$, guard-interval $$T_g = \frac{T_s}{15},$$

and usable symbol-interval $T_u = T_s - T_g = 10^{-3}/15$. The guard-interval is chosen to be at least as great as the channel delay-spread, $T_d$ such that, if the worst case $T_d = T_g$, is assumed, then the Nyquist-sampling frequency-interval (in Hertz) is equal to the reciprocal of the guard-interval, or in tones, is equal to $$\frac{T_u}{T_g} = 14.$$

Therefore, the propagation channels can be treated as being piece-wise constant over intervals of fourteen tones. This piece-wise constant interval can be denoted as a frequency smoothness interval.

The equivalent sample-duration of coherence interval 200, denoted T, is equal to the frequency smoothness interval times the number of OFDM symbols in the slot, $$T = \frac{T_u}{T_g} \frac{T_{s1}}{T_s}$$
$$= \frac{14 T_{s1}}{T_s}.$$

A one millisecond coherence interval 200, for example, contains fourteen OFDM symbols, so the sample-duration is $T = 14 \times 14 = 196$. The significance of the coherence interval sample-duration is that it represents the number of independent uses of the channel within each piecewise-constant frequency response interval.

As described above, service-antennas 106a-i derive their knowledge of the up-link channels (and by virtue of TDD reciprocity their knowledge of the down-link channels) from pilot signals that are transmitted by mobile terminals 108a-e. In an OFDM implementation, the transmission of pilot signals occurs separately in each of the tone-intervals in which the frequency-response is approximately piecewise-constant. The pilot sequences, therefore, are indexed by both tone and OFDM symbol (e.g., the pilot sequence may span more than one OFDM symbol).

For a given set of K mobile terminals 108, the most efficient pilot signals are mutually-orthogonal, and of necessity, of total sample-duration, $\tau_r$, greater than or equal to K. Further, the quality of the channel estimates can be improved if every mobile terminal 108 transmits at full power for all $\tau_r$ samples. Hence harmonically-related orthogonal complex sine-waves make ideal pilot sequences, for example, since they are easy to generate and have constant magnitude. Mobile terminals 108 may transmit their pilot sequences synchronously, and each service-antenna 106 may correlate its received pilot signal with each of the K pilot signals, which after scaling, yields the CSI between itself and that particular mobile terminal. As such, each service-antenna 106 derives its channel-estimates independently of the other service-antennas.

If $K > \tau_r$, the pilot signals cannot be perfectly orthogonal, and in such case, estimating propagation channels on the basis of the received pilot signals alone will result in correlated channel estimates. For example, the channel estimate to the k-th terminal can be corrupted by a linear combination of channels to all other terminals whose pilot sequences are correlated with the k-th pilot sequence. This correlation, known as pilot contamination, results in directed interference when channel estimates are utilized for down-link multiplexing and up-link de-multiplexing. For example, in directing a data-bearing symbol to a k-th mobile terminal 108, service-antennas 106a-i may inadvertently direct the same data-bearing symbol to other mobile terminals 108 whose pilot signals are correlated with the k-th pilot signal. The power of this directed interference increases with the number of service-antennas 106 at the same rate as the desired signal.

For a given coherence interval duration, the maximum number of orthogonal pilot signals is equal to the sample-duration T. Using pilot signals of this duration, however, would leave no time in the coherence interval for transmitting data. Moreover, the coherence interval duration cannot be lengthened arbitrarily because of the mobility of the mobile terminals, i.e., $$T_{s1} < \frac{\lambda}{4v},$$

where v is the speed of the mobile terminals and $\lambda$ is the wave-length. Therefore, the maximum number of terminals 108 that can be served simultaneously without incurring pilot contamination is $$K < T$$
$$= \frac{T_u}{T_g} \frac{T_{s1}}{T_s}$$
$$< \frac{\lambda T_u}{4 v T_g T_s}.$$

For example, K mobile terminals 108 may transmit up-link data synchronously, wherein a k-th mobile terminal may transmit a data-bearing (QAM—quadrature amplitude modulation) symbol, $q_k$, times a power-control variable, $\eta_k^{1/2}$. One skilled in the art will note that, for the sake of simplicity, subscripts denoting the tone-index and OFDM symbol-index are suppressed. Collectively, the K mobile terminals 108 transmit a K×1 vector, $s_r = D_\eta^{1/2} q$, where $D_\eta^{1/2}$ is the K×K diagonal matrix whose diagonal elements are the power-control parameters and $q$ is the K×1 vector of QAM symbols. The M service-antennas 106 collectively receive a M×1 vector, $x_r = \sqrt{\rho_r} G D_\eta^{1/2} q + w_r$, where G is a M×K matrix that represents the channel frequency-response between the mobile terminals and the service-antennas, $w_r$ represents additive receiver noise and interference, and $\rho_r$ is a scalar that represents overall channel strength. Again, one skilled in the art will note that subscripts denoting tone-index and OFDM symbol-index are suppressed for simplicity.

The matrix-valued propagation channel mixes the data-bearing symbols together, and service-antennas 106 process the received signal to restore the individual data-bearing symbols. For example, a service-antenna 106 may multiply the received signal by a K×M de-coding (de-multiplexing matrix), which depends on the channel-estimates, $\hat{q}=A_r x_r$. The de-coding matrix may employ matched-filtering, $A_r \propto \hat{G}^H$, where the superscript H denotes conjugate-transpose, or zero-forcing, $A_r \propto (\hat{G}^H \hat{G})^{-1} \hat{G}^H$. In the absence of channel-estimation error and noise, zero-forcing can recover the individual QAM symbols, while matched-filtering requires orthogonality of the channels to the terminals (i.e., the column vectors of G have to be orthogonal) to recover the individual QAM symbols. The activity of increasing the number of service-antennas tends to make the channels to the terminals more nearly orthogonal, and therefore improves the performance of matched-filtering.

On the down-link, service-antennas 106a-i may selectively transmit a QAM symbol to each of the K terminals 108. For example, the K×1 vector of QAM symbols may be denoted as q which can be multiplied by a M×K pre-coding (multiplexing) matrix, $A_f$, to create the M×1 vector of signals which are collectively transmitted by the service-antennas, $s_f = A_f q$. Collectively, the K individual mobile terminals 108 receive the K×1 vector, $x_f = \sqrt{\rho_f} G^T A_f q + w_f$, where $w_f$ is additive noise and interference, and $\rho_f$ is a scalar that represents overall channel strength. The pre-coding matrix, which also may incorporate power control, may employ conjugate beam-forming, $A_r \propto \hat{G}^*$, where the superscript "*" denotes complex-conjugate, or zero-forcing, $A_r \propto \hat{G}^*(\hat{G}^T \hat{G}^*)^{-1}$. As in the case of down-link reception, the activity of increasing the number of service-antennas tends to make the channels to the terminals more nearly orthogonal, and therefore improves the performance of conjugate beam-forming.

In general, each cell 110 could include a concentrated LSAS array 104 of M antennas that could be responsible for communicating with K terminals. These K terminals comprise both service-antennas that require backhaul, and stationary terminals that require access. While the number of antennas M and terminals K may vary from one cell to another, within a given cell 110 each of the terminals 108a-e could be assigned a pilot signal that is orthogonal to the other K−1 pilot signals used in that cell, and each concentrated LSAS array 104 could be responsible only for its own terminals (i.e., there is no cooperation among cells in communicating with terminals, except for power-control). The one or more concentrated LSAS arrays 104a-i could employ pilot signals that are orthogonal within each cell 110 to mitigate pilot contamination and directed interference, as described above. Since the concentrated LSAS arrays 104a-i serve stationary terminals only, the problem of CSI acquisition is comparatively easy because for stationary terminals, once CSI is acquired it remains valid for long intervals of time. If the concentrated LSAS arrays 104a-i were forced to serve moving terminals their throughputs would be seriously compromised, as the number of terminals that they could handle would be relatively small due to the need for frequent re-acquisition of CSI. Therefore, the distributed service-antennas in upper tier 120 are better suited for handling moving terminals.

While the number of mobile terminals that can be simultaneously served—and therefore the total throughput to mobile terminals—is limited for the one or more concentrated LSAS arrays 104 by the number of antennas (which are, in turn, limited to due pilot contamination), distributed LSAS 102 has no cellular boundaries, and thus no hand-off between cells as terminals move. As such, large numbers of service-antennas 106 may be deployed at random, e.g., throughout a sports stadium, a college campus, or an entire city, to maintain a significantly large ratio of service-antennas 106 to mobile terminals 108, with each element sharing time and frequency resources. Moreover, increasing the amount of service-antennas 106 can produce sharper down-link beams and better discrimination of the individual up-link transmissions, which is a fundamental advantage over small-cells. As described above, the service-antennas 106 can obtain channel state information for propagation channels to the mobile terminals 108 through up-link pilot sequences and time-division duplex (TDD) reciprocity.

Therefore, in wireless communication system 100, distributed LSAS 102 is ideally suited for servicing mobile terminals over the one or more concentrated LSAS arrays 104 due to the scalable number of service-antennas for mobile terminal access. The cellular arrangement of the concentrated LSAS arrays 104 can be economically employed for providing backhaul service to the plurality of service-antennas within their respective cells which otherwise would require wired backhaul service.

As such, a dual-tier LSAS such as wireless communication system 100 combines the features of concentrated LSAS arrays and distributed LSAS. In an embodiment, an upper tier, featuring a distributed (cell-free) LSAS, is reserved for providing access points to mobile terminals. A lower tier, featuring a concentrated (cellular) LSAS, may operate in a different frequency band from the upper tier to provide backhaul links to the upper tier service-antennas as well as access service to stationary terminals. Each of the two tiers may be expanded to accommodate future traffic demands.

Figure 3:
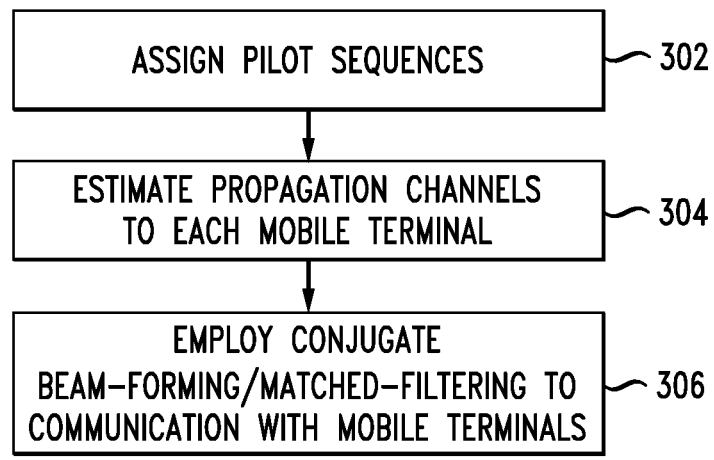
FIG. 3 illustrates a flowchart diagram for communicating in an upper tier of a dual-tier wireless communication system in accordance with an embodiment.

FIG. 3 illustrates a flowchart diagram for communicating in a dual-tier wireless communication system in accordance with an embodiment. Using wireless communication system 100 as an example, a plurality of service-antennas 106 are distributed in a designated coverage area to comprise distributed LSAS 102 for providing wireless access service to mobile terminals 108. Each of the plurality of service-antennas 106 may comprise a single antenna and share time and frequency resources with the other service-antennas. Alternatively, the plurality of service-antennas 106 may include multiple antenna service-antennas.

If a communication involves providing network access to mobile terminals, the plurality of service-antennas 106 of distributed LSAS 102 are employed. For example, a network server assigns (e.g., via service-antennas 106a-i) pilot sequences to distinguish between particular mobile terminals at 302. In principle one would like to assign orthogonal pilot sequences to every mobile terminal, but the large numbers of terminals and the short interval of time in which CSI must be acquired may preclude orthogonal pilot sequences. Terminals that are close together, when assigned substantially non-orthogonal pilot sequences are prone to pilot contamination, a form of coherent interference due to the confusion of the respective channel estimates. In an embodiment, any two terminals that are prone to inflicting pilot contamination on each other may be assigned pilot sequences that are nearly orthogonal, while terminals that are not prone to mutual pilot contamination may be assigned correlated pilots. Approaches to pilot assignment are specified in U.S. patent application Ser. No. 13/238,329, entitled "Cell-Free Large-Scale Antenna System", filed Sep. 21, 2011, which is incorporated herein by reference in its entirety. For example, a first approach assigns pilot sequences according to the location of the terminals. If $\tau_r$ is the duration of the pilot sequences, then a random $\tau_r \times \tau_r$ unitary matrix, $\Phi(x,y)$, is generated as a function of Cartesian position. This random field is correlated over space such that matrices taken close together are highly correlated, and matrices taken far apart are nearly independent of each other. A terminal at position (x,y) is assigned one of the $\tau_r$ columns of the random matrix as its pilot sequence which may be generally the column that is most uncorrelated with the pilot sequences of the terminal's neighbors. Another approach to pilot assignment may select a pilot sequence for each terminal based on a mathematical criterion involving slow-fading coefficients that attempts to minimize pilot contamination.

Once pilot sequences are assigned, each service-antenna 106a-i estimates its own propagation channels (CSI) to each of the mobile terminals 108a-e from received up-link composite pilot signals at 304. At 306, service-antennas 106a-i may employ conjugate beam-forming on down-link channels and matched-filtering on up-link channels to communicate with mobile terminals 108a-e based on the CSI.

Conjugate beam-forming and matched-filtering permit highly de-centralized operation. For example, for a down-link transmission, quadrature amplitude modulation (QAM) symbols intended for mobile terminals 108a-e may be sent to service-antennas 106a-i (e.g., from a network server), and each service-antenna 106 calculates its own signal to transmit to the mobile terminals 108. For an up-link transmission, each service-antenna 106a-i processes signals received from the mobile terminals using its own channel estimates to distinguish the sources of the various transmissions. Short coherence intervals (e.g., 1 ms or shorter) may be used to accommodate high mobility terminals. Alternatively, a mix of short and long coherence intervals may be used to accommodate both fast and slow mobile terminals.

In a large-scale designated coverage area (e.g., an entire city), propagation channels between certain service-antennas and a mobile terminal may be so weak that one or more service-antennas may be selectively excused from serving a distant mobile terminal. For example, antennas may be selectively excused from serving a mobile terminal based on a threshold (e.g., minimum signal strength) for providing wireless access service. In effect, each terminal is surrounded by an imaginary bubble whose interior encompasses the service-antennas that handle that terminal. Selectively excusing service-antennas from serving a particular terminal may, in certain instances, reduce the processing burden on certain service-antennas and reduce the backhaul traffic to and from particularly distant service-antennas.

Figure 4:
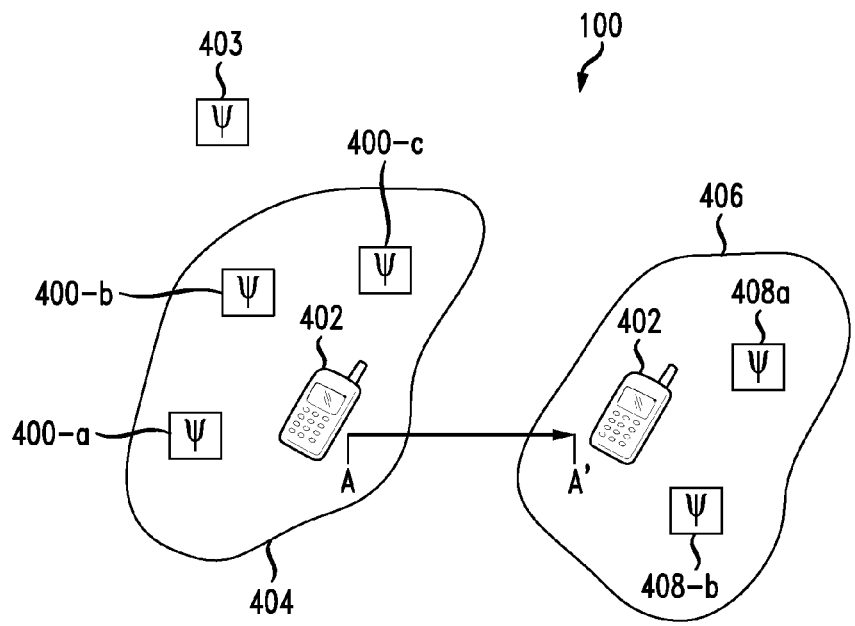
FIG. 4 illustrates a mobile terminal coverage area bubble in an upper tier of a dual-tier wireless communication system in accordance with an embodiment.

FIG. 4 illustrates a mobile terminal coverage area bubble in a dual-tier wireless communication system in accordance with an embodiment. As shown, a subset of service-antennas 400a-c that serve a particular mobile terminal 402 may be within a coverage area bubble 404 associated with the geographical location of mobile terminal 402. Service-antennas located outside of coverage area bubble 404 are excused from serving mobile terminal 402. However, as mobile terminal 402 moves through system 100 (e.g., along line segment A-A'), the coverage area bubble associated with the mobile terminal also may move or change shape (e.g., be nebulous, irregularly shaped or without precise boundaries) at various time intervals. For example, as mobile terminal 402 moves from position A to position A' along line segment A-A', coverage area bubble associated with mobile terminal 402 may move and change shape, e.g., from coverage area bubble 404 to coverage area bubble 406. Alternatively, the composition of a coverage area bubble may be based on a threshold for providing wireless access service (e.g., minimum gain threshold). In such case, service-antennas 408a-b located inside of coverage area bubble 406 serve mobile terminal 402, while service-antennas located outside of coverage area bubble 406 (e.g., service-antenna 403 and service-antennas 400a-c) may be excused from serving mobile terminal 402.

In a communication for providing backhaul capabilities to one or more of the service-antennas 106 or providing network access for fixed terminals 112, the one or more concentrated LSAS arrays 104a-i are employed. As described above, lower tier 130 constitutes a cellular arrangement of concentrated, but very large LSAS arrays 104a-i. For example, a lower tier LSAS array may be a conformal array configured on a curtain wall of a large building such as a skyscraper. Moreover, a concentrated LSAS array may be split into two or more physically-separate sub-arrays without substantially changing the operation of the system. In an embodiment, lower tier LSAS arrays may be concentrated entirely on stationary access points and terminals because the maximum number of customers that can be served is limited by the time that it takes to transmit orthogonal up-link pilot sequences, which in turn must be less than the coherence interval of the propagation channel. By excluding mobile terminals from service, every doubling of the number of service-antennas permits a doubling of terminals, and therefore a doubling of aggregate throughput. In an embodiment, long coherence interval (e.g., 5 ms or longer) may be used in the lower tier LSAS to minimize the channel estimation overhead, as the users of lower tier LSAS are stationary or slow moving. Since CSI changes very slowly, it may not be necessary to re-estimate CSI for every terminal in each coherence interval. Moreover, the plurality of service-antennas 106a-i and the one or more concentrated large-scale antenna system arrays 104a-i may operate in disjoint frequency bands with respect to each other to mitigate interference.

As such, in wireless communication system 100 an upper tier 120, featuring a distributed (cell-free) LSAS, provides access points to mobile terminals, and a lower tier 130, featuring a concentrated (cellular) LSAS provides backhaul capabilities to the upper tier service-antennas. In addition to being specialized, the two tiers may be expanded to accommodate future traffic demands. In particular, upper tier 120 may be expanded with additional service-antennas to increase the ratio of service-antennas to mobile terminals, while the lower tier LSAS arrays may be enlarged for additional backhaul capabilities for the cost of additional optical-fiber. Because the cost of additional optical-fiber depends largely on the total number of LSAS arrays and not on the number of service-antennas per array, once an underground conduit has been built to the site of an LSAS array, extra fiber can be installed at minimal cost as needed.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
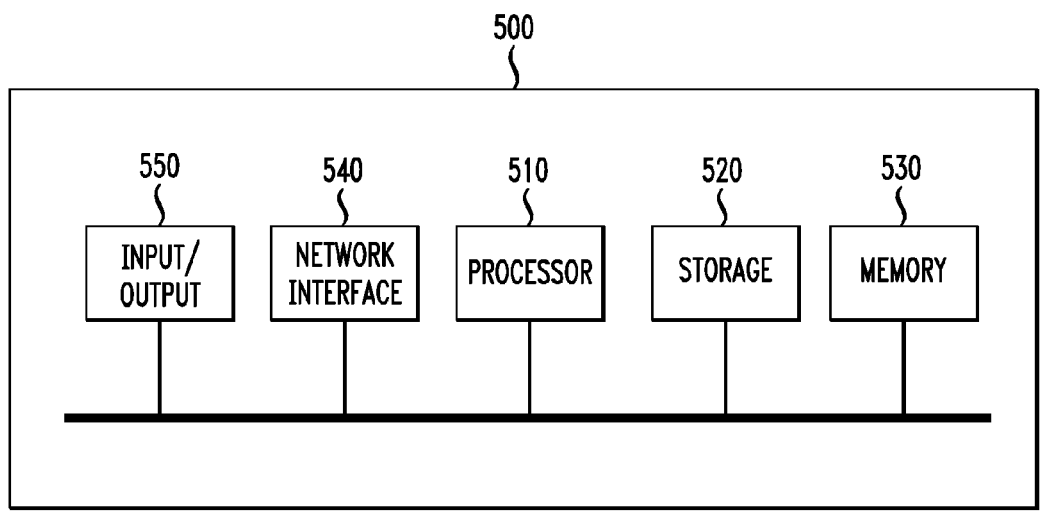
FIG. 5 is a high-level block diagram of an exemplary computer that may be used for implementing a dual-tier wireless communication system.

A high-level block diagram of an exemplary computer that may be used to implement systems, apparatus and methods described herein is illustrated in FIG. 5. Computer 500 comprises a processor 510 operatively coupled to a data storage device 520 and a memory 530. Processor 510 controls the overall operation of computer 500 by executing computer program instructions that define such operations. The computer program instructions may be stored in data storage device 520, or other computer readable medium, and loaded into memory 530 when execution of the computer program instructions is desired. Referring to FIG. 1, for example, service-antennas 106a-l may comprise one or more components of computer 500. Thus, the method steps of FIG. 3 can be defined by the computer program instructions stored in memory 530 and/or data storage device 520 and controlled by processor 510 executing the computer program instructions. For example, the computer program instructions can be implemented as computer executable code programmed by one skilled in the art to perform an algorithm defined by the method steps of FIG. 3. Accordingly, by executing the computer program instructions, processor 510 executes an algorithm defined by the method steps of FIG. 3. Computer 500 also includes one or more network interfaces 540 for communicating with other devices via a network, such as network 110. Computer 500 also includes one or more input/output devices 550 that enable user interaction with computer 500 (e.g., display, keyboard, mouse, speakers, buttons, etc.).

Processor 510 may include both general and special purpose microprocessors, and may be the sole processor or one of multiple processors of computer 500. Processor 510 may comprise one or more central processing units (CPUs), for example. Processor 510, data storage device 520, and/or memory 530 may include, be supplemented by, or incorporated in, one or more application-specific integrated circuits (ASICs) and/or one or more field programmable gate arrays (FPGAs).

Data storage device 520 and memory 530 each comprise a tangible non-transitory computer readable storage medium. Data storage device 520, and memory 530, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 550 may include peripherals, such as a printer, scanner, display screen, etc. For example, input/output devices 550 may include a display device such as a cathode ray tube (CRT), plasma or liquid crystal display (LCD) monitor for displaying information to the user, a keyboard, and a pointing device such as a mouse or a trackball by which the user can provide input to computer 500.

Any or all of the systems and apparatus discussed herein, including service-antennas 106a-i may be implemented using a computer such as computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A dual-tier wireless communication system comprising:
an upper tier cell-free large-scale antenna system including a plurality of service-antennas distributed in a designated coverage area for providing wireless access service to mobile terminals, wherein each of the plurality of service-antennas simultaneously serves the mobile terminals; and
a lower tier of one or more concentrated large-scale antenna system arrays arranged within a plurality of cells of the designated coverage area for providing backhaul service to the plurality of service-antennas, wherein the upper tier and the lower tier operate in disjoint frequency bands with respect to each other.

2. The system of claim 1, further comprising each of the plurality of service-antennas in the upper tier configured to determine channel state information for mobile terminals based on uplink pilot sequences and time-division duplex reciprocity.

3. The system of claim 2, further comprising each of the plurality of service-antennas in the upper tier configured to beam-form data-bearing symbols for transmission to the mobile terminals based on the channel state information.

4. The system of claim 3, wherein an operation to beam-form data bearing symbols includes a linear pre-coding operation.

5. The system of claim 2, further comprising each of the plurality of service-antennas in the upper tier configured to distinguish between data-bearing symbols received simultaneously from the mobile terminals based on the channel state information.

6. The system of claim 2, further comprising each of the plurality of service-antennas in the upper tier configured to determine a threshold for providing wireless access service to one or more of the mobile terminals based on the channel state information.

7. The system of claim 1, further comprising the one or more concentrated large-scale antenna system arrays in the lower tier configured to provide wireless access service for fixed terminals.

8. The system of claim 1, wherein the one or more concentrated large-scale antenna system arrays in the lower tier comprise a conformal array on a surface of a structure.

9. The system of claim 1, wherein each of the plurality of service-antennas in the upper tier comprise a single antenna.

10. The system of claim 1, wherein each of the plurality of service-antennas in the upper tier share time and frequency resources.

11. A method of communicating data over a dual-tier wireless communication system comprising an upper tier cell-free large-scale antenna system including a plurality of service-antennas distributed in a designated coverage area and a lower tier of one or more concentrated large-scale antenna system arrays arranged within a plurality of cells of the designated coverage area, the method comprising:
- communicating data utilizing the plurality of service-antennas in the upper tier to provide wireless access service for mobile terminals, wherein each of the plurality of service-antennas simultaneously serves the mobile terminals; and
- communicating data utilizing the one or more concentrated large-scale antenna system arrays in the lower tier to provide backhaul service for the plurality of service-antennas in the upper tier, wherein the upper tier and the lower tier operate in disjoint frequency bands with respect to each other.

12. The method of claim 11, wherein communicating data utilizing the plurality of service-antennas in the upper tier includes determining, at each of the plurality of service-antennas, channel state information for mobile terminals based on uplink pilot sequences and time-division duplex reciprocity.

13. The method of claim 12, wherein communicating data utilizing the plurality of service-antennas in the upper tier includes beam-forming, at each of the plurality of service-antennas, data-bearing symbols for transmission to the mobile terminals based on the channel state information.

14. The method of claim 13, wherein beam-forming includes a linear pre-coding operation.

15. The method of claim 12, wherein communicating data utilizing the plurality of service-antennas in the upper tier includes distinguishing, at each of the plurality of service-antennas, between data-bearing symbols received simultaneously from the mobile terminals based on the channel state information.

16. The method of claim 12, wherein communicating data utilizing the plurality of service-antennas in the upper tier includes determining, at each of the plurality of service-antennas, a threshold for providing wireless access service to one or more of the mobile terminals based on the channel state information.

17. The method of claim 11, further comprising communicating data utilizing the one or more concentrated large-scale antenna system arrays in the lower tier to provide wireless access service for fixed terminals.

18. The method of claim 11, wherein the one or more concentrated large-scale antenna system arrays in the lower tier comprise a conformal array on a surface of a structure.

19. The method of claim 11, wherein each of the plurality of service-antennas in the upper tier comprise a single antenna.

20. The method of claim 11, wherein each of the plurality of service-antennas in the upper tier share time and frequency resources.

* * * * *